(12) United States Patent
Baek et al.

(10) Patent No.: US 10,823,089 B2
(45) Date of Patent: Nov. 3, 2020

(54) CONTINUOUSLY VARIABLE VALVE DURATION SYSTEM AND OPERATING METHOD THEREOF

(71) Applicant: HYUNDAI KEFICO CORPORATION, Gyeonggi-do (KR)

(72) Inventors: Jin Wook Baek, Gyeonggi-do (KR); Lae Kyeom Kim, Gangwon-do (KR)

(73) Assignee: HYUNDAI KEFICO CORPORATION, Gyeonggi-do (KR)

( * ) Notice: Subject to any disclaimer, the term of this patent is extended or adjusted under 35 U.S.C. 154(b) by 325 days.

(21) Appl. No.: 15/637,870

(22) Filed: Jun. 29, 2017

(65) Prior Publication Data
US 2018/0003113 A1    Jan. 4, 2018

(30) Foreign Application Priority Data

Jun. 30, 2016    (KR) .................. 10-2016-0082387

(51) Int. Cl.
*F02D 13/02* (2006.01)
*F01L 13/00* (2006.01)
(Continued)

(52) U.S. Cl.
CPC ...... *F02D 13/0207* (2013.01); *F01L 13/0015* (2013.01); *F02D 41/00* (2013.01);
(Continued)

(58) Field of Classification Search
CPC .. F02D 13/0207; F02D 13/0015; F02D 41/00; F02D 41/22; F02D 41/2464; F02D 2041/001; F02D 13/0215; F02D 13/00; F02D 13/11; F01L 2013/10; F01L 2800/00; F01L 2800/14; Y02T 10/18; Y02T 10/40
(Continued)

(56) References Cited

U.S. PATENT DOCUMENTS 6,330,870 B1    12/2001 Inoue et al.
9,777,604 B2 *  10/2017 Pietrzyk .............. F01L 1/34409
(Continued)

FOREIGN PATENT DOCUMENTS

JP    2004-340013 A    12/2004
JP    2008-157049 A    7/2008
(Continued)

OTHER PUBLICATIONS

Office Action dated Mar. 25, 2020 in corresponding Chinese Application No. 201710506913.4.

*Primary Examiner* — Devon C Kramer
*Assistant Examiner* — Kelsey L Stanek
(74) *Attorney, Agent, or Firm* — Mintz Levin Cohn Ferris Glovsky and Popeo, P.C.; Peter F. Corless

(57) ABSTRACT

A continuously variable valve duration (CVVD) system includes an electronic control unit (ECU) configured to output a command for adjusting an actuator and a controller configured to determine a operation range of a control shaft of the actuator and adjust the control shaft in the determined operation range based on the command of the ECU. The controller positions the control shaft at a predetermined target phase and determines a control state of each target phase based on a target phase value transmitted from the actuator when the control shaft is positioned at the target phase.

14 Claims, 10 Drawing Sheets

(51) Int. Cl.
 *F02D 41/24* (2006.01)
 *F02D 41/00* (2006.01)
 *F02D 41/22* (2006.01)
(52) U.S. Cl.
 CPC ......... *F02D 41/22* (2013.01); *F02D 41/2464* (2013.01); *F01L 2013/10* (2013.01); *F01L 2800/00* (2013.01); *F01L 2800/14* (2013.01); *F02D 2041/001* (2013.01); *Y02T 10/18* (2013.01); *Y02T 10/40* (2013.01)
(58) Field of Classification Search
 USPC ...................................................... 123/90.15
 See application file for complete search history.

(56) References Cited

U.S. PATENT DOCUMENTS

| | | |
|---|---|---|
| 2003/0066501 A1 | 4/2003 | Park |
| 2005/0166895 A1* | 8/2005 | Yoshizawa .......... F02D 41/0005 123/346 |
| 2006/0112917 A1* | 6/2006 | Nakamura .............. F01L 1/024 123/90.16 |
| 2008/0167789 A1 | 7/2008 | Okamoto et al. |
| 2009/0099752 A1* | 4/2009 | Ikoma ................. F02D 13/0238 701/103 |
| 2017/0037745 A1* | 2/2017 | Baek ....................... F01L 1/352 |
| 2017/0074179 A1* | 3/2017 | Mikawa .............. F02D 41/0002 |
| 2017/0356352 A1* | 12/2017 | Baek .................. F02D 13/0219 |
| 2017/0362968 A1* | 12/2017 | Baek ....................... F01L 13/00 |

FOREIGN PATENT DOCUMENTS

| | | |
|---|---|---|
| JP | 2008-286173 A | 11/2008 |
| JP | 2009-197766 A | 9/2009 |
| JP | 2009-209714 A | 9/2009 |
| KR | 10-2001-0021301 A | 3/2001 |
| KR | 10-2003-0030203 A | 4/2003 |
| KR | 10-1593925 B1 | 2/2016 |

* cited by examiner

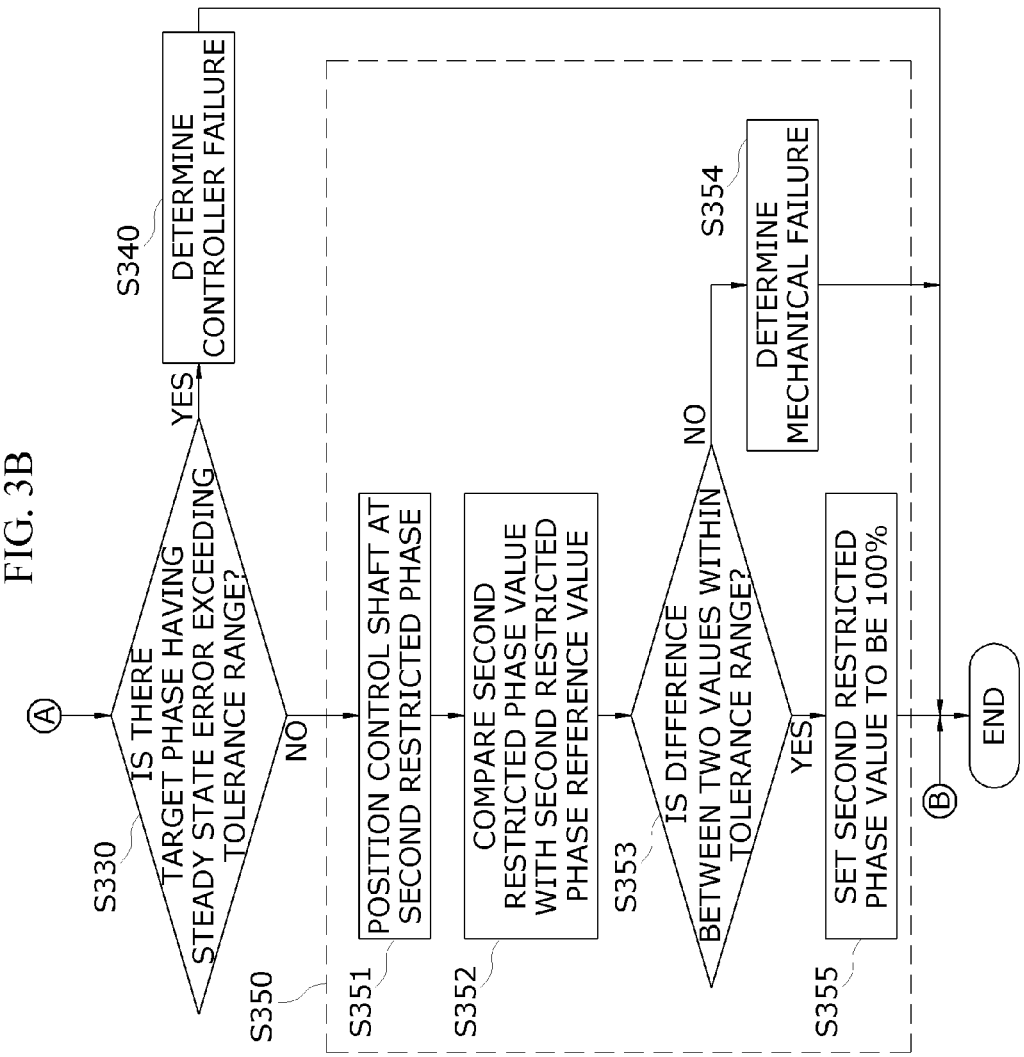

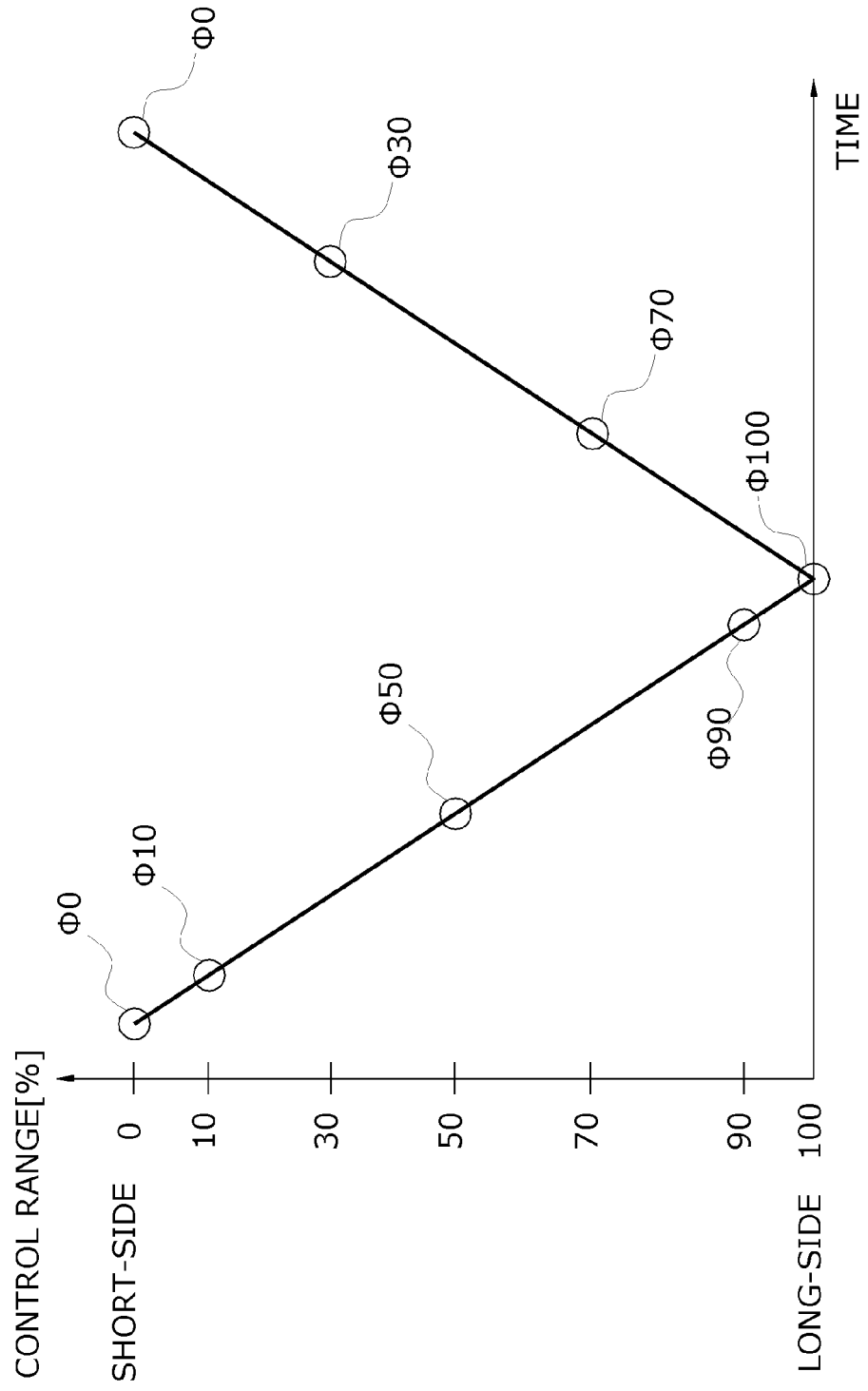

CONTINUOUSLY VARIABLE VALVE DURATION SYSTEM AND OPERATING METHOD THEREOF

CROSS-REFERENCE TO RELATED APPLICATION

This application claims priority to Korean Patent Application No. 2016-0082387, filed on Jun. 30, 2016, the disclosure of which is incorporated herein by reference in its entirety.

TECHNICAL FIELD

The present disclosure relates to a continuously variable valve duration (CVVD) system, and more particularly, to a CVVD system that determines a operation range of a control shaft of an actuator to improve control instability and monitors control accuracy for the control shaft to enhance control reliability, and an operating method thereof.

RELATED ART

Generally, an internal combustion engine generates power by receiving and burning fuel and air in a combustion chamber. When air taken in, an intake valve is actuated by operation of a camshaft, and the air taken into a combustion chamber when the intake valve is open. In particular, an exhaust valve is actuated by operation of the camshaft, and the air is discharged from the combustion chamber when the exhaust valve is open. However, an optimal operation for the intake value or exhaust valve changes based on a rotational speed of an engine. In other words an appropriate lifting or valve-opening or closing timing changes based on the rotational speed of the engine. In order to realize an appropriate valve operation according to the rotational speed of the engine, research has been conducted on a continuously variable valve lift (CVVL) apparatus configured to design a plurality of cams to drive a valve or operate the valve by using a different lift based on the number of revolutions of an engine.

Continuously variable valve timing (CVVT) technology has been developed to adjust an opening timing of the valve. In particular, a valve opening timing and a valve closing timing are simultaneously adjusted while a valve duration is fixed. A conventional CVVL or CVVT apparatus has a complex configuration and a high cost. Accordingly, research and development have been conducted on a continuously variable valve duration (CVVD) system that adjust a valve duration using a simplified configuration to enhance fuel efficiency and performance of an engine. A CVVD system includes an actuator for selectively varying a rotational center position of a cam and a controller for adjusting the actuator. The controller adjusts the actuator based on a command received from an electronic control unit (ECU).

In particular, an actuator of a CVVD system includes a control shaft for selectively varying a central rotational position of a cam. It is possible to accurately control the cam and also accurately control a continuously variable valve when the control shaft is accurately controlled. Additionally, since a CVVD system includes an actuator, which is a mechanical element, the CVVD system may have an assembling or manufacturing tolerance of the actuator. When the tolerance is greater than a tolerance range, operational stability of the CVVD system is difficult to maintain. Further, when the assembling or manufacturing tolerance of the actuator is not greater than the tolerance range but the control shaft is not accurately controlled, operational stability of the CVVD system is difficult to achieve.

The above information disclosed in this section is merely for enhancement of understanding of the background of the disclosure and therefore it may contain information that does not form the prior art that is already known in this country to a person of ordinary skill in the art.

SUMMARY

The present disclosure provides a continuously variable valve duration (CVVD) system that determines a operation range of a control shaft of an actuator to overcome control instability due to an assembling tolerance or a manufacturing tolerance and monitors control accuracy for the control shaft to provide more reliable control, and an operating method thereof.

According to an aspect of the present disclosure, a CVVD system configured to control a CVVD by adjusting an actuator for controlling the CVVD, may include an electronic control unit (ECU) configured to output a command for adjusting the actuator; and a controller configured to determine a operation range of a control shaft of the actuator and control the control shaft in the determined operation range based on the command of the ECU. The controller may be configured to position the control shaft at a predetermined target phase and determines a control state of each target phase on the basis of a target phase value transmitted by the actuator when the control shaft is positioned at the target phase.

The actuator may include a first stopper disposed at a first position to restrict movement of the control shaft in a first direction; a second stopper disposed at a second position to restrict movement of the control shaft in a second direction; and a sensor configured to output a value corresponding to a phase at which the control shaft is positioned to the controller. The sensor may be configured to output a first restricted phase value, which corresponds to a phase of the control shaft when the movement thereof is restricted by the first stopper, and a second restricted phase value, which corresponds to a phase of the control shaft when the movement thereof is restricted by the second stopper.

The controller may be configured to determine the first restricted phase value to be about 0% when a difference between the first restricted phase value and a predetermined first restricted phase reference value is within a tolerance range and may determine the second restricted phase value to be about 100% when a difference between the second restricted phase value and a predetermined second restricted phase reference value is within the tolerance range. The controller may be configured to determine that a mechanical failure occurs when a difference between the first restricted phase value and a predetermined first restricted phase reference value is greater than a tolerance range or when a difference between the second restricted phase value and a predetermined second restricted phase reference value is greater than the tolerance range.

The controller may be configured to determine whether a steady state error for each of the target phases is greater than a tolerance range and may determine that a controller failure occurs when there is a target phase having a steady state error exceeding the tolerance range. The controller may be configured to monitor the control state for each of the target phases while determining the operation range of the control shaft or may monitor the control state of each of the target phases while and after determining the operation range of the control shaft.

According to another aspect of the present disclosure, an operating method of a CVVD system configured to operate a CVVD by adjusting an actuator for controlling a CVVD, may include determining, by the controller a first restricted phase value in a operation range of a control shaft of the actuator based on a determining command; determining, by the controller, a control state of each target phase while sequentially positioning the control shaft at predetermined target phases in a first direction after determining the first restricted phase value; and determining, by the controller, a second restricted phase value in the operation range of the control shaft of the actuator after determining the control state for each of the target phases.

The determining of a first restricted phase value may include positioning the control shaft at a first restricted phase; comparing the first restricted phase value output corresponding to the first restricted phase with a predetermined first restricted phase reference value and determining whether a difference between the first restricted phase value and the first restricted phase reference value is within a tolerance range; and setting the first restricted phase value to be 0% when the difference between the first restricted phase value and the first restricted phase reference value is within the tolerance range. The determining of a first restricted phase value may include determining that a mechanical failure occurs when the difference between the first restricted phase value and the first restricted phase reference value is greater than the tolerance range.

The determining of a control state of each of the target phases may include determining whether a steady state error at each of the target phases is greater than a tolerance range and determining that a controller failure occurs when there is a target phase having a steady state error greater than the tolerance range. The determining of a control state of each target phase may include, when a steady state error at a target phase is not greater than the tolerance range, positioning the control shaft at a subsequent target phase and determining whether a steady state error at the subsequent target phase is greater than the tolerance range.

The determining of a second restricted phase value may include positioning the control shaft at a second restricted phase; comparing the second restricted phase value output corresponding to the second restricted phase with a predetermined second restricted phase reference value and determining whether a difference between the second restricted phase value and the second restricted phase reference value is within a tolerance range; and setting the second restricted phase value to be 100% when the difference between the second restricted phase value and the second restricted phase reference value is within the tolerance range.

The determining, by the controller of a second restricted phase value may include determining that a mechanical failure occurs when the difference between the second restricted phase value and the second restricted phase reference value is greater than the tolerance range. The determining, by the controller, of a second restricted phase value may further include secondarily determining the control state of each of the target phases while sequentially positioning the control shaft at predetermined target phases in a second direction after determining the second restricted phase value. The secondarily determining of the control state for each of the target phases may include determining whether a steady state error at each of the target phases is greater than a tolerance range and determining that a controller failure occurs when there is a target phase having a steady state error exceeding the tolerance range.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIGS. 3A and 3B are exemplary flowcharts showing a sequential order of a first embodiment in which a controller of a CVVD system learns an operation range of a control shaft according to an exemplary embodiment of the present disclosure;

FIG. 6 is an example graph showing a phase of a control shaft to be examined when a operation range of the control shaft is learned according to an exemplary embodiment of a controller of a CVVD system according to an embodiment of the present disclosure.

DETAILED DESCRIPTION

Figure 1:
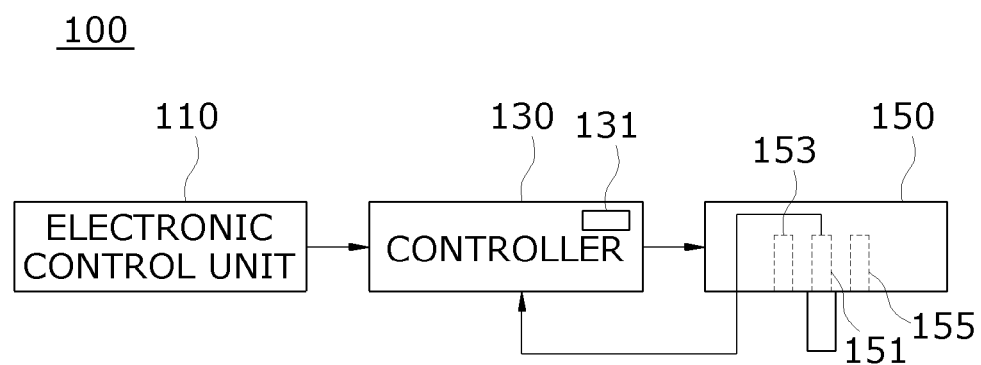
FIG. 1 is an exemplary diagram showing a configuration of a continuously variable valve duration (CVVD) system according to an exemplary embodiment of the present disclosure.

Specific structural and functional details disclosed herein are merely representative for the purpose of describing example embodiments. However, the present disclosure may be embodied in many alternate forms and is not to be construed as being limited to only the example embodiments set forth herein. Accordingly, while example embodiments of the disclosure are capable of various modifications and alternative forms, embodiments thereof are shown by way of example in the drawings and will herein be described in detail. However, it should be understood, however, that there is no intent to limit example embodiments of the present disclosure to the particular forms disclosed. Conversely, example embodiments are to cover all modifications, equivalents, and alternatives falling within the scope of the disclosure.

It should be understood that, although the terms first, second, etc. may be used herein to describe various elements, these elements are not limited by these terms. These terms are only used to distinguish one element from another. For example, a first element could be termed a second element, and, similarly, a second element could be termed a first element, without departing from the scope of example embodiments of the present disclosure.

It should be understood that when an element is referred to as being "connected" or "coupled" to another element, the element can be directly connected or coupled to the other element or intervening elements may be present. Conversely, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to limit the example embodiments of the disclosure. As used herein, the singular forms "a," "an," and "the" are intended to include the plural forms as well unless the context clearly indicates otherwise. It should be further understood that the terms "comprises," "comprising," "includes," "including," "has," and/or "having," when used herein, specify the presence of stated features, integers, steps, operations, elements, and/or components, but do not preclude the presence or addition of one or more other features, integers, steps, operations, elements, components, and/or groups thereof. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in networked coupled computer systems so that the computer readable media is stored and executed in a distributed fashion, e.g., by a telematics server or a Controller Area Network (CAN).

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum). Unless otherwise defined, all terms (including technical and scientific terms) used herein have the same meaning as commonly understood by one of ordinary skill in the art to which example embodiments belong. It should be further understood that terms, e.g., those defined in commonly used dictionaries, should be interpreted as having a meaning that is consistent with their meaning in the context of the relevant art and are not to be interpreted in an idealized or overly formal sense unless expressly so defined herein. It should also be noted that in some alternative implementations, functions/acts noted in a specific block may occur out of the order noted in a flowchart. For example, two blocks shown in succession may in fact be executed substantially concurrently or may sometimes be executed in a reverse order depending upon functionality/acts involved.

Hereinafter, a continuously variable valve duration (CVVD) system and an operating method thereof according to an embodiment of the present disclosure will be described in detail with reference to the accompanying drawings. FIG. 1 is an exemplary diagram showing a configuration of a CVVD system according to an exemplary embodiment of the present disclosure. Referring to FIG. 1, a CVVD system (hereinafter referred to as a "system") 100 according to an exemplary embodiment of the present disclosure may include an electronic control unit (ECU) 110, an actuator controller (hereinafter referred to as a "controller") 130, and an actuator 150.

The system 100 may be configured to adjust a duration of a continuously variable valve and may implement a long duration or a short duration for the continuously variable valve (hereinafter referred to as a "valve") being adjusted by the system 100. In the system 100 according to an exemplary embodiment of the present disclosure, the controller 130 may be configured to determine a operation range of a control shaft 151 and monitor control accuracy of the control shaft while determining the operation range. A determining process of the controller 130 may be performed at an initial system manufacturing stage or during system operation. It is possible to overcome control instability that may occur due to an assembling tolerance or a manufacturing tolerance of the system 100 by correcting (resetting) the operation range of the control shaft 151 through the determining process. Furthermore, control reliability may be improved because the controller 130 monitors the control accuracy of the control shaft 151 during the determining process.

A configuration of the system 100 will be described in detail below. The ECU 110 communicates with the controller 130 through a vehicle network communication method such as controller area network (CAN) communication. Additionally, the ECU 110 appropriately provides a control command for adjusting a valve to the controller 130 according to a vehicle state, (e.g., the number of revolutions of an engine, a load state of a vehicle, etc). For example, the control command may include a target phase of the control shaft 151. In addition, the ECU 110 may provide a command for determining an operation range of the control shaft 151 of the actuator 150 (a "determining command") to the controller 130 based on an external command (e.g., an instruction of a user).

The controller 130 may be configured to output an electric current corresponding to a control command (e.g., a target phase) originating in the ECU 110 to adjust the actuator 150. In particular, the controller 130 may be configured to adjust the target phase provided by the ECU 110 based on a phase deviation between the target phase and an actual phase fed back from the actuator 150 and outputs the electric current on the basis of the "corrected target phase." Additionally, when the determining command is received from the ECU 110, the controller 130 may be configured to perform an operation corresponding to a prestored determining algorithm to determine the operation range of the control shaft 151.

The controller 130 may be configured to stores the learned operation range in the storage unit 131 (e.g., updates a prestored operation range to the determined operation range). When the control command is received from the ECU 110, the controller 130 may be configured to adjust the actuator 150 on the basis of the operation range stored in the storage unit 131. In addition, the controller 130 may be configured to monitor control accuracy of the control shaft 151 while determining the operation range of the control shaft 151 according to the determining command. In order to determine the control range and monitor the control accuracy of the control shaft, the controller 130 may store a reference value for each phase in the storage unit 131. A detailed operation of the controller 130 will be described with reference to the accompanying drawings.

The actuator 150 operates based on the electric current output by the controller 130 to adjust a duration of a continuously variable valve. In other words, the actuator 150 may be provided with the control shaft 151 cooperating with a camshaft (not shown) to adjust the continuously variable value, and the actuator 150 controls the duration of the continuously variable valve by adjusting the phase of the control shaft 151.

Additionally, the actuator 150 may include a stopper for restricting the operation range of the control shaft 151. A first stopper 153 may be disposed at a first position to restrict movement of the control shaft 151 in a first direction, and a second stopper 155 may be disposed at a second position to restrict movement of the control shaft 151 in a second direction. The actuator 150 may include a sensor 157 configured to output an absolute value (e.g., a phase value) corresponding to the phase of the control shaft 151. In particular, the sensor 157 may output a value that corresponds to the phase of the control shaft 151 (a first restricted phase value) when movement thereof is restricted by the first stopper 153 and outputs a value that corresponds to the phase of the control shaft 151 (a second restricted phase value) when movement thereof is restricted by the second stopper 155. Additionally, when the control shaft 151 is positioned at the target phase while being controlled by the controller 130, the sensor 157 may output a value that corresponds to the phase of the control shaft 151 (e.g., the target phase value).

The phase values output by the sensor 157 may be provided to the controller 130 and used by the controller 130 to determine the operation range of the control shaft 151 and determine control accuracy. An example illustrating a concept of adjusting the control shaft 151 in a operation range (e.g., a section A-B) set by the stoppers 153 and 155 is shown in FIG. 2.

Figure 2:
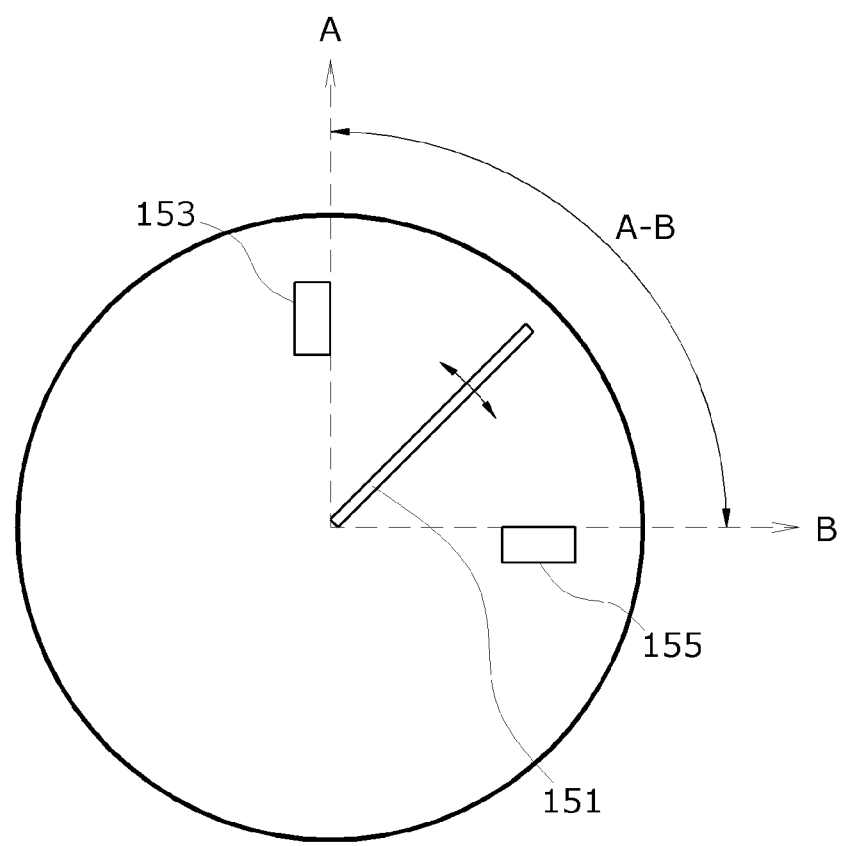
FIG. 2 is an exemplary diagram showing an example illustrating a concept of adjusting a control shaft in a operation range that is set by a stopper according to an exemplary embodiment of the present disclosure.

In FIG. 2, the operation range (e.g., the section A-B) of the control shaft 151 may be adjusted according to the positions of the first and second stoppers 153 and 155 and may be controlled in the operation range (e.g., the section A-B) by the controller 130. Additionally, when the controller 130 determine the operation range of the control shaft 151, the sensor 157 outputs the value that corresponds to the phase of the control shaft 151 (e.g., the first restricted phase value) when the movement thereof is restricted by the first stopper 153, outputs the value that corresponds to the phase of the control shaft 151 (e.g., the second restricted phase value) when the movement thereof is restricted by the second stopper 155, and outputs the value that corresponds to the phase of the control shaft 151 when the control shaft 151 is positioned at the target phase.

The configuration and functions of the CVVD system according to an exemplary embodiment of the present disclosure have been described above. The controller of the CVVD system according to an exemplary embodiment of the present disclosure will be described in detail below. The controller 130 of the present disclosure may be configured to output the electric current corresponding to the control command (e.g., the target phase) originating in the ECU 110 to adjust the actuator 150. In particular, when the determining command is received from the ECU 110, the controller 130 may be configured to perform the operation corresponding to the prestored determining algorithm to determine the operation range of the control shaft 151. In addition, the controller 130 may be configured to monitor the control accuracy of the control shaft 151 while determining the operation range of the control shaft 151 according to the determining command. Since the operation of the controller 130 according to the control command is well known technology, a process in which the controller 130 learns the operation range of the control shaft 151 will be mainly described.

Figure 3A:
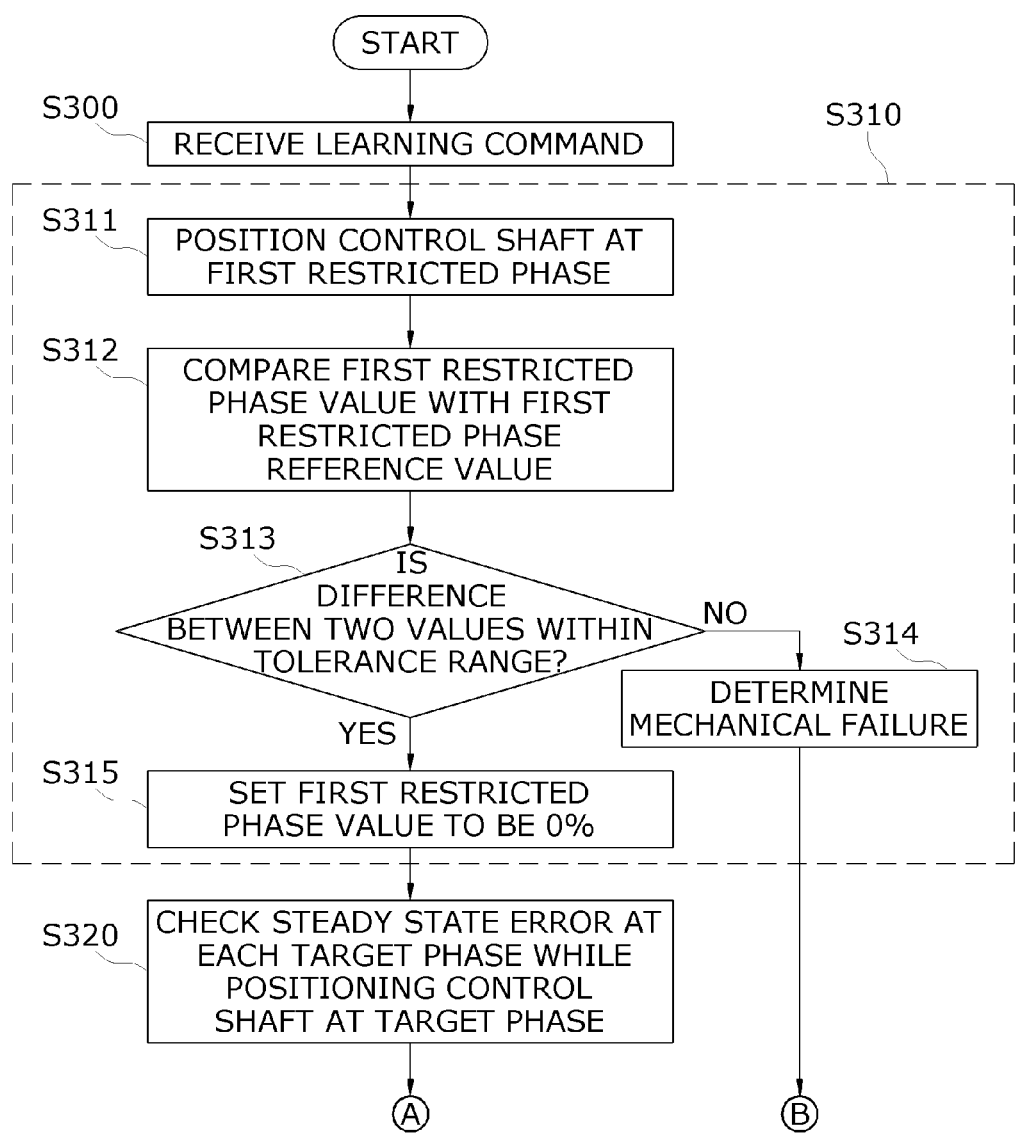
Figure 4:
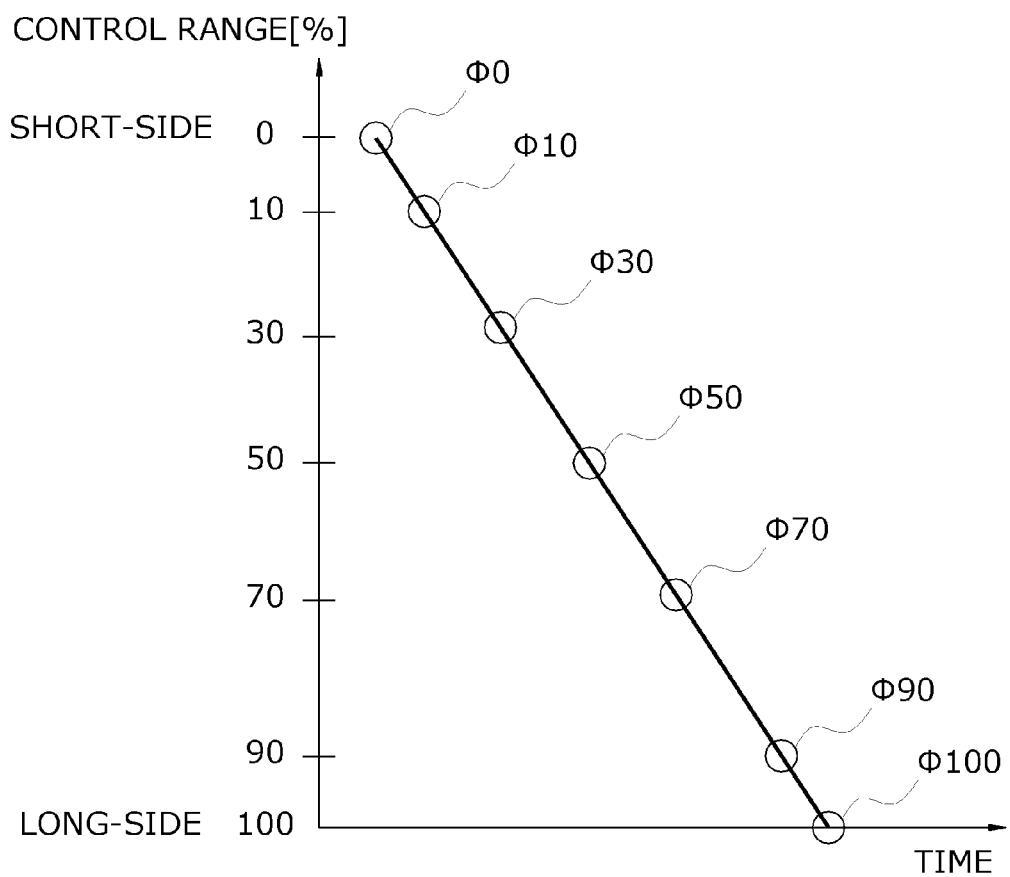
FIG. 4 is an example graph showing a phase of a control shaft to be examined during a determining process shown in FIGS. 3A and 3B according to an exemplary embodiment of the present disclosure.
Figure 5A:
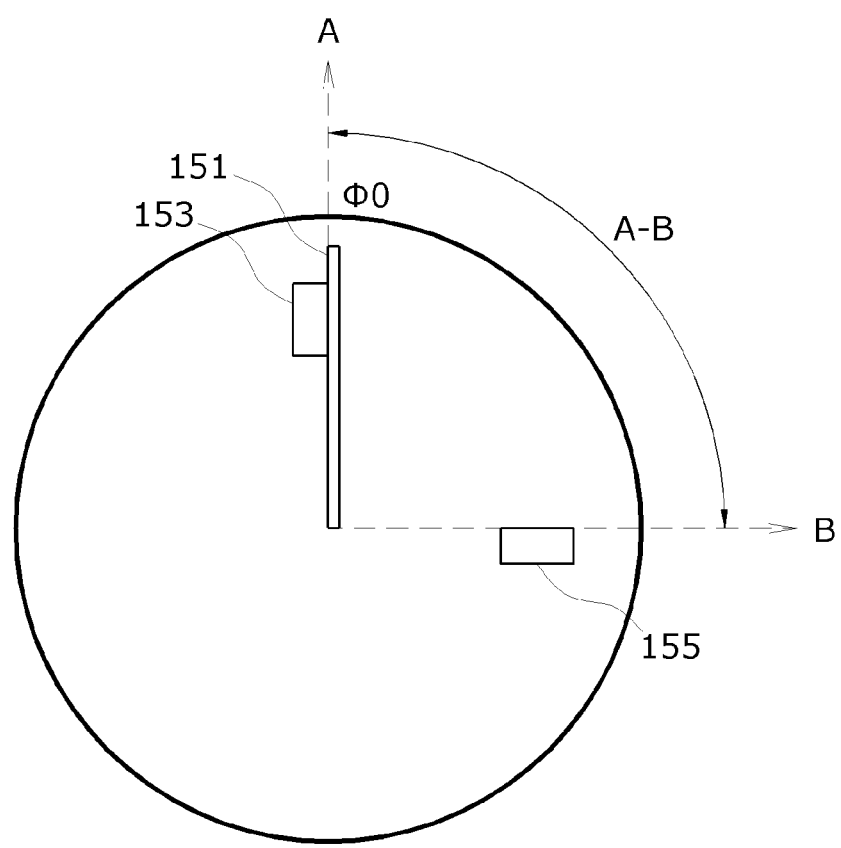
FIG. 5A is an example diagram showing a position of a control shaft when a first restricted phase of a control shaft is learned according to an exemplary embodiment of the present disclosure.
Figure 5B:
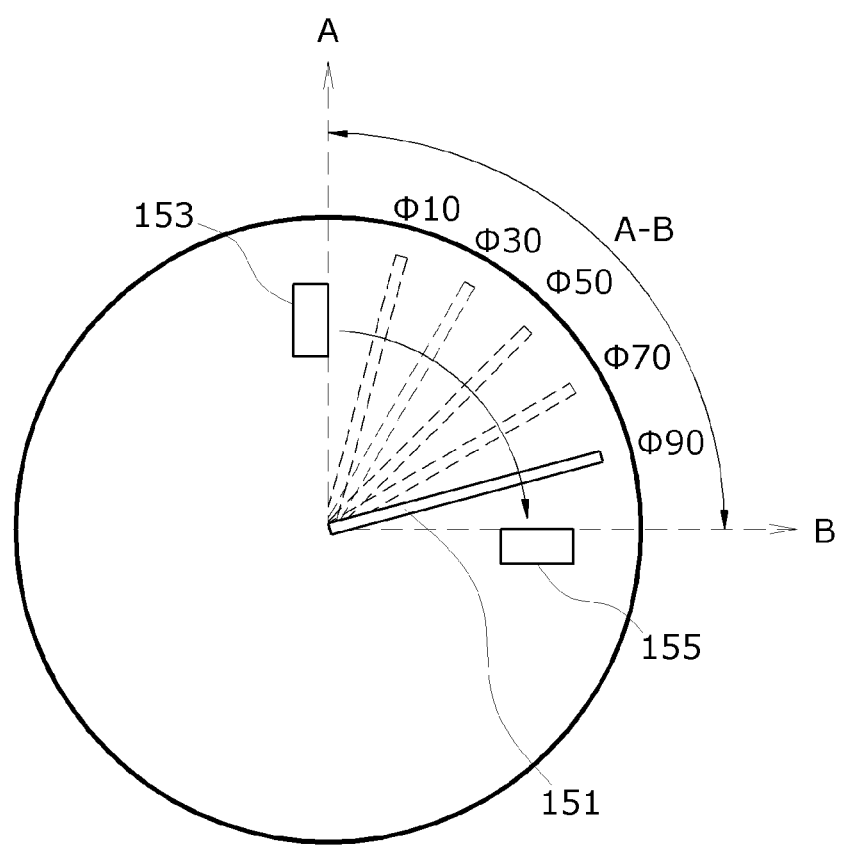
FIG. 5B is an example diagram showing a position of a control shaft for each target phase to determine control accuracy according to an exemplary embodiment of the present disclosure.
Figure 5C:
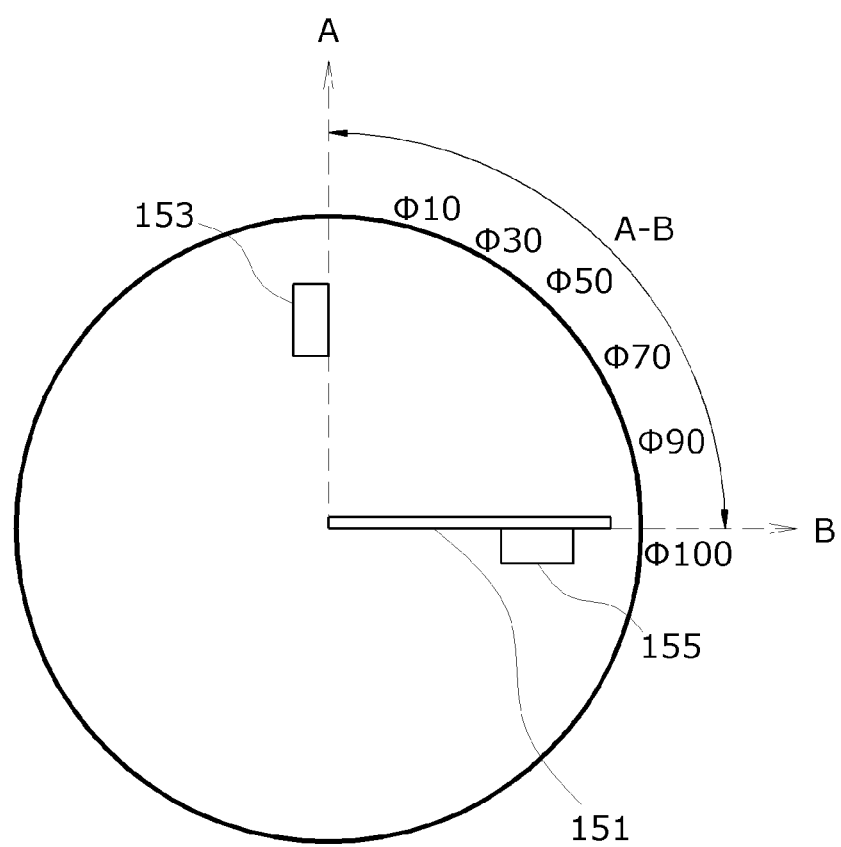
FIG. 5C is an example diagram showing a position of a control shaft when a second restricted phase of a control shaft is learned according to an exemplary embodiment of the present disclosure.

FIGS. 3A and 3B are exemplary flowcharts showing a sequential order of a first embodiment in which a controller of a CVVD system determine a operation range of a control shaft according to an exemplary embodiment of the present disclosure. FIG. 4 is an example graph showing a phase of a control shaft to be examined during a determining process shown in FIGS. 3A and 3B. FIGS. 5A to 5C are exemplary diagrams showing a position of each phase of the control shaft during the determining process shown in FIGS. 3A and 3B. In detail, FIG. 5A is an exemplary diagram showing a position of the control shaft when a first restricted phase of the control shaft is learned. FIG. 5B is an exemplary diagram showing a position of the control shaft for each target phase to determine control accuracy. FIG. 5C is an exemplary diagram showing a position of the control shaft when a second restricted phase of the control shaft is learned.

A process of determining an operation range of the control shaft, which is performed by the controller according to an exemplary embodiment of the present disclosure, will be described with reference to FIGS. 3A to 5C. To facilitate understanding of the process of determining the operation range of the control shaft, it is assumed that the control shaft is controlled in the operation range shown in FIG. 2 when a system is designed and phases of the control shaft to be examined are phases corresponding to about 0%, 10%, 30%, 50%, 70%, 90%, and 100% in the operation range, as shown in FIG. 4.

A phase to be determined first is referred to as a "first restricted phase," a phase to be determined last is referred to as a "second restricted phase," phases in which control accuracy is examined are referred to as "target phases," and a phase which is finally examined among the target phases is referred to a "maximal target phase." Here, the first restricted phase, which is a determining start phase, is a phase φ0 corresponding to 0% in the operation range, and the second restricted phase, which is a determining end phase, is a phase φ100 corresponding to 100% in the operation range. The determining start phase and the determining end phase do not change but the target phases and the maximal target phase may change. In other words, in FIG. 4, a phase φ10 corresponding to 10% in the operation range, a phase φ30 corresponding to 30% in the operation range, a phase φ50 corresponding to 50% in the operation range, a phase φ70 corresponding to 70% in the operation range, and a phase φ90 corresponding to 90% in the operation range are target phases, and the target phase φ90 is the maximal target phase among the target phases φ10, φ30, φ50, φ70, and φ90.

A process of determining an operation range of the control shaft, which is performed by the controller according to an exemplary embodiment of the present disclosure, will be described below with reference to the accompanying drawings. When the controller 130 of the present disclosure receives a determining command (S300), a process of determining an operation range of the control shaft 151 begins. The determining command may be provided by the ECU 110. When the process of determining an operation range of the control shaft 151 is started according to S300, the controller 130 may be configured to position the control shaft 151 at a first restricted phase and learns a phase value of the control shaft 151 positioned at the first restricted phase (S310).

More specifically with respect to S310, when the determining command is received, the controller 130 may be configured to position the control shaft at the first restricted phase (S311). In other words, the controller 130 may be configured to adjust the control shaft 151 until the control shaft 151 is stopped by the first stopper 153. When the control shaft 151 is positioned at the first restricted phase in S311, the sensor 157 may output a first restricted phase value, which corresponds to the first restricted phase, to the controller 130, and the controller 130 may be configured to receive the first restricted phase value output by the sensor 157, compares the received first restricted phase value with a predetermined first restricted phase reference value (S312), and determines whether a difference between the first restricted phase value and the first restricted phase reference value is within a tolerance range (S313). In other words, when the determination result of S313 is that the difference between the first restricted phase value and the first restricted phase reference value is greater than the tolerance range (no in S313), the controller 130 may be configured to determine that there is a mechanical failure (e.g., an assembly failure, a processing failure, etc.) (S314) and ends the process of determining the operation range of the control shaft.

In S314, the controller 130 may display the determination result, that is, the occurrence of the mechanical failure. Conversely, when the determination result of S313 is that the difference between the first restricted phase value and the first restricted phase reference value is within the tolerance range (yes in S313), the controller 130 may determine the current first restricted phase value to be 0% (S315). Through the above-described process, the controller 130 may determine the first restricted phase of the control shaft 151.

As shown in FIG. 5B, after S310, the controller 130 may be configured to monitor a steady state error at each predetermined target phase while sequentially positioning the control shaft 151 at the predetermined target phases (S320). The steady state error may be monitored at each predetermined target phase until the control shaft 151 achieves the maximum target phase. The steady state error may be used to verify that a system is normally operating, and a detailed description thereof will be omitted. In this exemplary embodiment, the target phases are set to be about φ10, φ30, φ50, φ70, and φ90. Accordingly, as shown in FIG. 5B, the controller 130 may be configured to monitor for the steady state error while sequentially positioning the control shaft 151 at about φ10, φ30, φ50, φ70, and φ90.

While checking for a steady state error at each of the target phases in S320, the controller 130 may be configured to determine whether there is a target phase having a steady state error that is greater than a tolerance range (S330). When the determination result of S330 is that there is a target phase having a steady state error that is greater than the tolerance range (yes in S330), the controller 130 may be configured to determine that there is a controller failure (S340) and ends the process of determining the operation range of the control shaft. In S340, the controller 130 may display the determination result, that is, the occurrence of a controller failure and the target phase having the steady state error that is greater than the tolerance range.

Conversely, when the determination result of S330 is that there is no target phase having a steady state error that is greater than the tolerance range (no in S330), the controller 130 may be configured to determine the first restricted phase of the control shaft 151 (S350). In S330, the determination of whether there is a target phase having a steady state error that is greater than the tolerance range may be sequentially performed for each target phase. In other words, while sequentially positioning the control shaft 151 at the target phases, the controller 130 may be configured to determine whether a steady state error at each of the target phases is greater than the tolerance range, determines that there is a controller failure when the steady state error is greater than the tolerance range, positions the control shaft 151 at a subsequent target phase when the steady state error is less than the tolerance range, and then determines whether a steady state error at the subsequent target phase is greater than the tolerance range. In S330, the determination of whether a steady state error at each of the target phases is greater than the tolerance range is performed until the control shaft 151 is positioned at the maximum target phase.

More specifically with respect to S350, as shown in FIG. 5C, the controller 130 may be configured to position the control shaft 151 at a second restricted phase (S351). In particular, the controller 130 may be configured to actuate the control shaft 151 until the control shaft 151 is stopped by the second stopper 155. When the control shaft 151 is positioned at the second restricted phase in S351, the sensor 157 may output a second restricted phase value, which corresponds to the second restricted phase, to the controller 130. The controller 130 may be configured to receive the second restricted phase value output from the sensor 157, compares the received second restricted phase value with a predetermined second restricted phase reference value (S352), and determines whether a difference between the second restricted phase value and the second restricted phase reference value is within a tolerance range (S353).

When the determination result of S353 is that the difference between the second restricted phase value and the second restricted phase reference value is greater than the tolerance range (e.g., no in S353), the controller 130 may be configured to determine that there is a mechanical failure (e.g., an assembly failure, a processing failure, etc.) (S354) and ends the process of determining the operation range of the control shaft. In S354, the controller 130 may be configure to display the result of the determination, that is, the occurrence of a mechanical failure.

Conversely, when the determination result of S353 is that the difference between the second restricted phase value and the second restricted phase reference value is within the tolerance range (yes in S353), the controller 130 may be configured to determine the current second restricted phase value to be 100% (S355). Through the above-described process, the controller 130 may be configured to determine the second restricted phase value of the control shaft 151. Additionally, the controller 130 may be configured to adjust the control shaft 151 based on the first restricted phase value and the second restricted phase value that are set through the determining as the operation range. As shown in FIG. 4, an example of monitor whether steady state errors at all of the target phases are greater than the tolerance range while determining the first restricted phase and the second restricted phase has been described above.

However the controller 130 may be configured to monitor whether steady state errors at some of the target phases are greater than the tolerance range while determining the first restricted phase and the second restricted phase and then monitor whether steady state errors at the other target phases exceed the tolerance range while moving the control shaft 151 to the first restricted phase after determining the first and second restricted phases.

Figure 7:
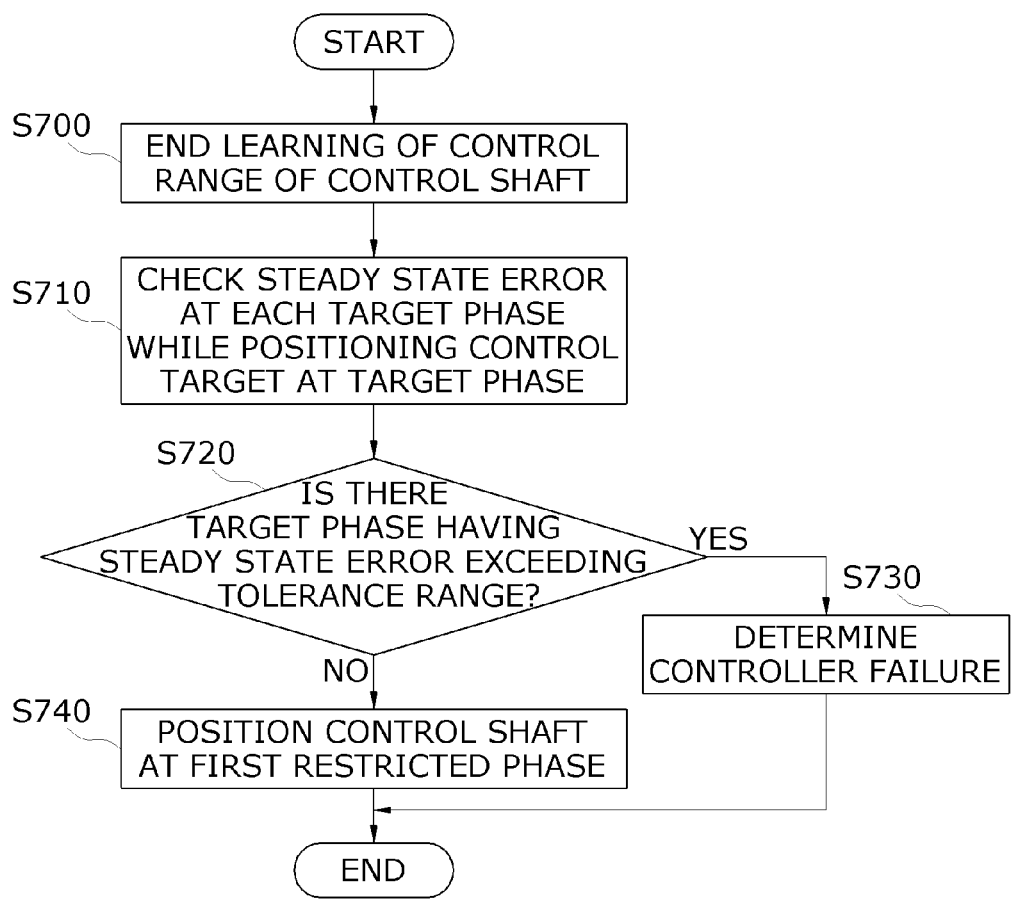
FIG. 7 is an exemplary flowchart showing a sequential order according to an exemplary embodiment in which the controller of the CVVD system learns the operation range of the control shaft according to an exemplary embodiment of the present disclosure.

FIG. 6 is an example graph showing a phase of a control shaft to be examined when a operation range of the control shaft is determined based to a second embodiment of a controller of a CVVD system according to an embodiment of the present disclosure. FIG. 7 is an exemplary flowchart showing a sequential order according to the second embodiment in which the controller of the CVVD system learns the operation range of the control shaft according to an exemplary embodiment of the present disclosure. An operation of the controller according to the second embodiment will be described below with reference to FIGS. 6 and 7. However, since the operation according to the second embodiment is performed after the operation range of the control shaft 151 is determined according to the first embodiment (FIGS. 3A and 3B), the description that has been provided in the first embodiment will be omitted, and an operation after the operation range is learned will be described below.

In the first embodiment, steady state errors may be monitored at the target phases of about $\varphi 10$, $\varphi 30$, $\varphi 50$, $\varphi 70$, and $\varphi 90$ while the operation range of the control shaft 151 is being determined. Alternatively, in the second embodiment, steady state errors may be at the target phases of about $\varphi 10$, $\varphi 50$, and $\varphi 90$ while the operation range of the control shaft 151 is being determined. Additionally, in the first exemplary embodiment, whether the steady state error at each of the target phases is greater than the tolerance range is monitored while the control shaft 151 is being moved in one direction (the first direction). Alternatively, in the second exemplary embodiment, whether the steady state error at each of the target phases is greater than the tolerance range is monitored while the control shaft 151 is being moved in one direction (e.g., the first direction), and then whether the steady state error at each of the target phases is greater than the tolerance range is determined while the control shaft 151 is moved in another direction (e.g., the second direction).

When the determining of the operation range of the control shaft 151 is complete according to the operation that has been described with reference to FIGS. 3A and 3B (S700), the controller 130 may be configured to monitor the steady state error at the predetermined target phases $\varphi 70$ and $\varphi 30$ while sequentially positioning the control shaft 151 at the target phases (S710). In this exemplary embodiment, the target phases in S710 may be set to be different from the target phases at which the steady state errors are checked. However, the target phases in S710 may be set to be the same as the target phases at which the steady state errors are checked. While checking the steady state error for each of the target phases in S710, the controller 130 may be configured to determine whether there is a target phase having a steady state error exceeding a tolerance range (S720).

When the determination result of S720 is that there is a target phase having a steady state error exceeding the tolerance range (yes in S720), the controller 130 may be configured to determine that there is a controller failure (S730). In this case, the controller 130 may be configured to display the determination result, that is, the occurrence of a controller failure, and the target phase having the steady state error exceeding the tolerance range. Conversely, when the determination result of S720 is that there is no target phase having a steady state error exceeding the tolerance range (no in S720), the controller 130 may be configured to position the control shaft 151 at a first restricted phase (S740). The determining of the operation range of the control shaft 151 and the monitoring of control accuracy of the control shaft 151 may be repeatedly performed to provide a more reliable and accurate examination, and a greater number of target phases may be set to check the control accuracy.

According to the CVVD system and the operating method thereof, the controller 130 may be configured to determine the operation range of the control shaft 151 of the actuator 150 and monitor control accuracy of the control shaft 151 while determining the operation range. Accordingly, since the controller 130 determine the operation range of the control shaft 151 through the determining process and adjusts the control shaft based on the determined operation range, it is possible to overcome control instability that may be caused by an assembling tolerance or a manufacturing tolerance of the system 100.

Furthermore, control reliability may be improved because the controller 130 may be configured to monitor the control accuracy of the control shaft 151 during the determining process. According to the CVVD system according to an exemplary embodiment of the present disclosure, a controller may be configured to determine a operation range of a control shaft of an actuator and monitor control accuracy of the control shaft while determining the operation range. Accordingly, since the controller determines the operation range of the control shaft through the determining process and adjusts the control shaft based on the learned operation range, more stable control may be may be provided and instability caused by an assembling tolerance or a manufacturing tolerance of the system may be improved. Furthermore, since the controller may be configured to monitor the control accuracy of the control shaft during the determining process control reliability may be improved.

Even though all of the components of the above-described exemplary embodiment of the present disclosure may be combined as one component or operate in combination, the disclosure is not limited to the embodiment. In other words, all of the components may be selectively combined as one or more components to operate within the scope of the disclosure. Also, each component may be implemented with one independent hardware device, but some or all of the components may be selectively combined and implemented as a computer program having a program module for performing some or all functions combined in one or more hardware devices. Further, such a computer program may be stored in a computer-readable recording medium such as a universal serial bus (USB) memory, a compact disc (CD), a flash memory, or the like. The exemplary embodiment of the present disclosure may be implemented by reading and executing the computer program. Examples of the computer-readable recording medium may include a magnetic recording medium, an optical recording medium, a carrier wave medium, and the like.

The CVVD system and the operating method thereof according to the present disclosure have been described with reference to exemplary embodiments. However, the present disclosure is not limited to the exemplary embodiment, and it should be apparent to those skilled in the art that various alternatives, modifications, and variations can be made therein without departing from the spirit and scope of the present disclosure. Accordingly, the embodiment and the accompany drawings of the present disclosure are to be considered descriptive and not restrictive of the disclosure, and do not limit the technical scope of the disclosure. The scope of the disclosure should be to be construed by the appended claims, and all technical ideas within the scope of their equivalents should be construed as being included in the scope of the disclosure.

What is claimed is:

1. A continuously variable valve duration (CVVD) system configured to operate a CVVD, comprising:
   an actuator that selectively varies a rotational center position of a cam, wherein the actuator includes a control shaft;
   an electronic control unit (ECU) configured to output a command for adjusting the actuator; and
   a controller configured to determine an operation range of the control shaft of the actuator and adjust the control shaft in the operation range based on the command of the ECU,
   wherein the controller is configured to position the control shaft at predetermined target phases and determines a control state of each target phase of the predetermined target phases based on a target phase value transmitted by the actuator when the control shaft is positioned at the each target phase,
   wherein the actuator comprises:
      a first stopper disposed at a first position to restrict movement of the control shaft in a first direction;
      a second stopper disposed at a second position to restrict movement of the control shaft in a second direction; and
      a sensor configured to output a value corresponding to a phase at which the control shaft is positioned to the controller.

2. The CVVD system of claim 1, wherein the sensor outputs a first restricted phase value, which corresponds to a phase of the control shaft when the movement thereof is restricted by the first stopper, and a second restricted phase value, which corresponds to a phase of the control shaft when the movement thereof is restricted by the second stopper.

3. The CVVD system of claim 2, wherein the controller is configured to determine the first restricted phase value to be 0% when a difference between the first restricted phase value and a predetermined first restricted phase reference value is within a tolerance range, and determines the second restricted phase value to be 100% when a difference between the second restricted phase value and a predetermined second restricted phase reference value is within the tolerance range.

4. The CVVD system of claim 2, wherein the controller is configured to determine that a mechanical failure occurs when a difference between the first restricted phase value and a predetermined first restricted phase reference value is greater than a tolerance range or when a difference between the second restricted phase value and a predetermined second restricted phase reference value is greater than the tolerance range.

5. The CVVD system of claim 1, wherein the controller is configured to determine whether a steady state error for the each target phase exceeds a tolerance range and is configured to determine that a controller failure occurs when there is a target phase having a steady state error greater than the tolerance range.

6. The CVVD system of claim 1, wherein the controller is configured to monitor the control state of the each target phase while determining the operation range of the control shaft or is configured to monitor the control state of the each target phase during and after determining the operation range of the control shaft.

7. An operating method of a continuously variable valve duration (CVVD) system configured to control a CVVD by adjusting an actuator for operating the CVVD, comprising:
   determining, by a controller, a first restricted phase value in an operation range of a control shaft of the actuator based on a determining command;
   determining, by the controller, a control state of each target phase while sequentially positioning the control shaft at predetermined target phases in a first direction after determining the first restricted phase value; and
   determining, by the controller, a second restricted phase value in the operation range of the control shaft of the actuator after determining the control state of the each target phase,
   wherein the determining the control state of the each target phase includes determining whether a steady state error at the each target phase is greater than a tolerance range and determining that a controller failure occurs when there is a target phase having a steady state error greater than the tolerance range.

8. The operating method of claim 7, wherein the determining the first restricted phase value comprises:
   positioning, by the controller, the control shaft at a first restricted phase;
   comparing, by the controller, the first restricted phase value output corresponding to the first restricted phase with a predetermined first restricted phase reference value and determining whether a difference between the first restricted phase value and the first restricted phase reference value is within a tolerance range; and
   setting, by the controller, the first restricted phase value to be 0% when the difference between the first restricted phase value and the first restricted phase reference value is within the tolerance range.

9. The operating method of claim 8, wherein the determining the first restricted phase value includes determining that a mechanical failure occurs when the difference between the first restricted phase value and the first restricted phase reference value is greater than the tolerance range.

10. The operating method of claim 7, wherein the determining the control state of the each target phase includes when a steady state error at a target phase is less than the tolerance range, positioning, by the controller, the control shaft at a subsequent target phase and determining whether a steady state error at the subsequent target phase is greater than the tolerance range.

11. The operating method of claim 7, wherein the determining the second restricted phase value comprises:
   positioning, by the controller, the control shaft at a second restricted phase;
   comparing, by the controller, the second restricted phase value output corresponding to the second restricted phase with a predetermined second restricted phase reference value and determining whether a difference between the second restricted phase value and the second restricted phase reference value is within a tolerance range; and
   setting, by the controller, the second restricted phase value to be 100% when the difference between the second restricted phase value and the second restricted phase reference value is within the tolerance range.

12. The operating method of claim 11, wherein the determining the second restricted phase value includes determining, by the controller, that a mechanical failure occurs when the difference between the second restricted phase value and the second restricted phase reference value is greater than the tolerance range.

13. The operating method of claim 7, wherein the determining the second restricted phase value further includes secondarily determining, by the controller, the control state of each target phase while sequentially positioning the control shaft at predetermined target phases in a second direction after determining the second restricted phase value.

14. The operating method of claim 13, wherein the secondarily determining the control state of the each target phase includes determining, by the controller, whether a steady state error at the each target phase is greater than a tolerance range and determining that a controller failure occurs when there is a target phase having a steady state error exceeding the tolerance range.

* * * * *